(12) United States Patent
Ward

(10) Patent No.: US 8,016,554 B2
(45) Date of Patent: Sep. 13, 2011

(54) COMBINATION HYDRODYNAMIC AND ROLLING BEARING SYSTEM

(75) Inventor: Daniel Ward, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 1500 days.

(21) Appl. No.: 11/657,248

(22) Filed: Jan. 24, 2007

(65) Prior Publication Data

US 2007/0280824 A1    Dec. 6, 2007

Related U.S. Application Data

(60) Provisional application No. 60/763,969, filed on Feb. 1, 2006.

(51) Int. Cl.
*F01D 25/18* (2006.01)
*F04D 29/047* (2006.01)
*F04D 29/049* (2006.01)

(52) U.S. Cl. ......... 415/175; 415/229

(58) Field of Classification Search ......... 384/99, 384/126, 127; 415/175, 292, 229
See application file for complete search history.

(56) References Cited

U.S. PATENT DOCUMENTS

| | | | |
|---|---|---|---|
| 2,623,353 A * | 12/1952 | Gerard | 60/39.091 |
| 3,759,588 A * | 9/1973 | Anderson | 384/101 |
| 3,854,781 A * | 12/1974 | Bildtsen | 384/102 |
| 4,370,106 A * | 1/1983 | Lauterbach | 417/407 |
| 4,542,994 A * | 9/1985 | Mohsin | 384/101 |
| 4,624,356 A * | 11/1986 | Hanks et al. | 192/85 CA |
| 4,629,261 A * | 12/1986 | Eiermann et al. | 310/90.5 |
| 5,509,517 A * | 4/1996 | Berenson et al. | 192/65 |
| 6,220,829 B1 * | 4/2001 | Thompson et al. | 417/407 |
| 6,717,308 B2 * | 4/2004 | Chen et al. | 310/90 |
| 6,962,443 B2 * | 11/2005 | Gomyo | 384/123 |
| 7,025,579 B2 * | 4/2006 | Woollenweber et al. | 417/407 |

* cited by examiner

*Primary Examiner* — Edward Look
*Assistant Examiner* — Sean J Younger
(74) *Attorney, Agent, or Firm* — Warn Partners, P.C.

(57) ABSTRACT

The present invention is directed toward a hybrid bearing which will have the advantages of ball bearings as well as hydrodynamic oil films. The present invention is a hybrid bearing assembly for a turbocharger unit, having an inner race track with a series of grooves, and one or more roller balls located in the grooves of the inner race track. There is also an outer race track having a series of grooves for receiving the one or more roller balls, where the outer race track circumscribes the inner race track. The hybrid bearing also includes a sleeve made from an established tribological material located inside the inner race track, with a shaft located inside the sleeve. A hydrodynamic oil film is located between the sleeve and the shaft, wherein the hydrodynamic oil film allows the shaft to spin at greater speeds than the inner race track.

17 Claims, 2 Drawing Sheets

COMBINATION HYDRODYNAMIC AND ROLLING BEARING SYSTEM

CROSS-REFERENCE TO RELATED APPLICATIONS

This application claims the benefit of U.S. Provisional Application No. 60/763,969, filed Feb. 1, 2006.

FIELD OF THE INVENTION

The present invention relates to turbochargers having a turbine, compressor, and a bearing system for the shaft upon which the turbine wheel is mounted.

BACKGROUND OF THE INVENTION

Turbochargers are generally known and used for increasing power in both internal combustion and diesel engines. Exhaust gas is used to provide energy for a turbine, and the turbine powers a compressor. The compressor receives air from atmosphere, compresses it, and forces the air into the intake manifold of the engine. The turbine includes a turbine wheel located in a turbine housing, and the compressor includes a compressor wheel located in a compressor housing; both the compressor wheel and the turbine wheel are mounted on a common shaft forming a rotor assembly. The shaft features a bearing system positioned in an intermediate housing between the compressor and the turbine which allows the shaft to rotate at very high speeds.

Typical bearing systems for these shafts employ the use of hydrodynamic oil films, these bearing systems have clearances between the intermediate housing and the bearing, and the bearing and the shaft. The clearance between the bearing and the intermediate housing is typically 3.5 to 4 times larger than the clearance between the bearing and the shaft. The reason for this proportion in clearances is due to the hydrodynamic forces that act on the oil films. The clearances allow the shaft to tilt inside the bearing housing during operation; because of the tilting of the rotor assembly, the clearances between the turbine wheel and the turbine housing and the compressor wheel and the compressor housing must be large enough to prevent the turbine wheel from coming into contact with the turbine housing, and the compressor wheel from coming into contact with the compressor housing. One problem that exists with this type of configuration is that larger tolerances between the compressor wheel and the compressor housing, and between the turbine wheel and the turbine housing, reduce the overall efficiency of the turbocharger.

Many attempts have been made to introduce the use of ball bearings into turbochargers because of the improved response time, improved friction, and improved stiffening of the rotor assembly, thereby allowing tighter tolerances between the compressor wheel and the compressor housing, as well as between the turbine wheel and the turbine housing, improving the overall efficiency of the turbocharger. A major significant drawback to the use of ball bearings in a turbocharger assembly is that because of the higher levels of heat and, more importantly, the higher shaft speeds that overstress the rolling elements in the bearing, ball bearings often fail when used in a turbocharger assembly.

Accordingly, there exists a need for a turbocharger which can incorporate the advantages of a ball bearing such as the improved response time, improved friction, and improved stiffening of the rotor assembly while at the same time avoiding bearing failure.

SUMMARY OF THE INVENTION

The present invention is directed toward a hybrid bearing which will have the advantages of ball bearings as well as hydrodynamic oil films. A hybrid bearing assembly for a turbocharger unit includes an inner race track with a series of grooves, and one or more roller balls located in the grooves of the inner race track. There is also an outer race track having a series of grooves for receiving the one or more roller balls, where the outer race track circumscribes the inner race track. The hybrid bearing also includes a sleeve made from an established tribological material located inside the inner race track, with a shaft located inside the sleeve. A hydrodynamic oil film is located between the sleeve and the shaft, wherein the hydrodynamic oil film allows the shaft to spin at greater speeds than the inner race track. The shaft supports a turbine wheel on one end, and a compressor wheel on the opposite end, both of which are used in a turbocharger unit.

The hydrodynamic oil film compensates for a small amount of misalignment in the hybrid bearing assembly and also absorbs heat from the shaft. The hybrid bearing also includes a series of diametric grooves and radial holes to allow lubricating oil to reach the rolling balls and the hydrodynamic oil film.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
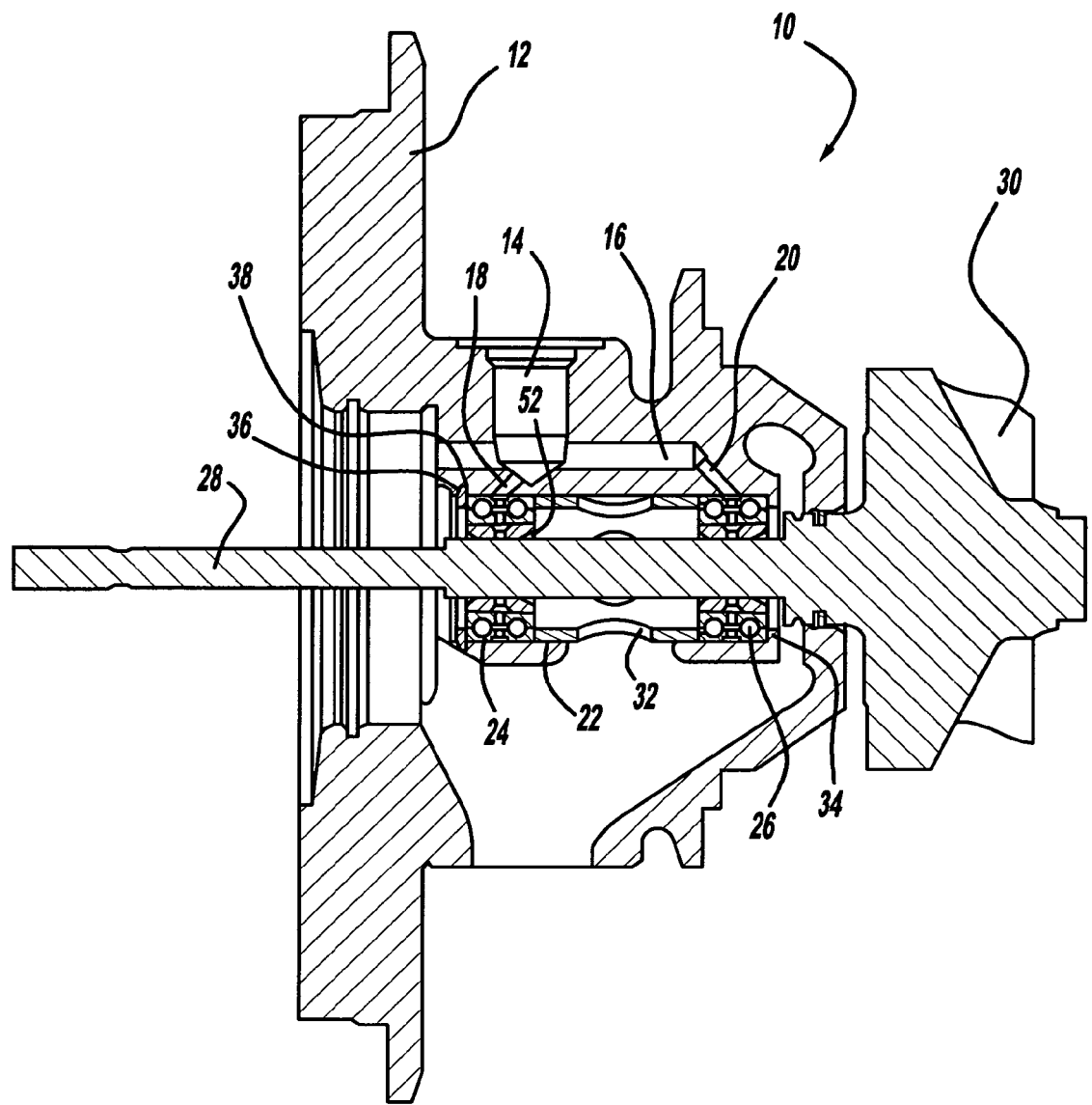
FIG. 1 is a sectional side view of an intermediate housing of a turbocharger incorporating the use of a hybrid bearing, according to the present invention.

Referring to FIG. 1, a portion of a turbocharger unit 10 is shown. The turbocharger unit 10 includes an intermediate housing 12 having various bores, ports, and openings to accommodate the components of the turbocharger unit 10. The intermediate housing 12 has a main oil inlet 14, which has a primary oil passageway 16, and two secondary oil passageways 18, 20. The secondary oil passageways 18, 20 lead into a bore 22. The bore 22 is used to support first hybrid bearing 24 and second hybrid bearing 26; first hybrid bearing 24 and second hybrid bearing 26 are used to support a shaft 28 having a turbine wheel 30. Connected to the intermediate housing 12 and surrounding the turbine wheel 30 is a turbine housing (not shown). Also mounted on the shaft 28 at the opposite end of the turbine wheel 30 is a compressor wheel (not shown) which is surrounded by a compressor housing (also not shown) connected to the intermediate housing 12.

Positioned between the first hybrid bearing 24 and second hybrid bearing 26 is a spacer sleeve 32, which positions the first hybrid bearing 24 in proximity to the secondary oil passageway 18, and the second hybrid bearing 26 in proximity to the secondary oil passageway 20.

Second hybrid bearing 26 also rests against a stop 34, which is part of the bore 22. At the opposite end of the bore 22, there is a snap ring 36 which sits in an annular groove 38 and holds the first hybrid bearing 24 in place. Hence, the snap ring 36 holds the first hybrid bearing 24 in place, next to the spacer sleeve 32, which in turn holds the second hybrid bearing 26 against the stop 34.

Figure 2:
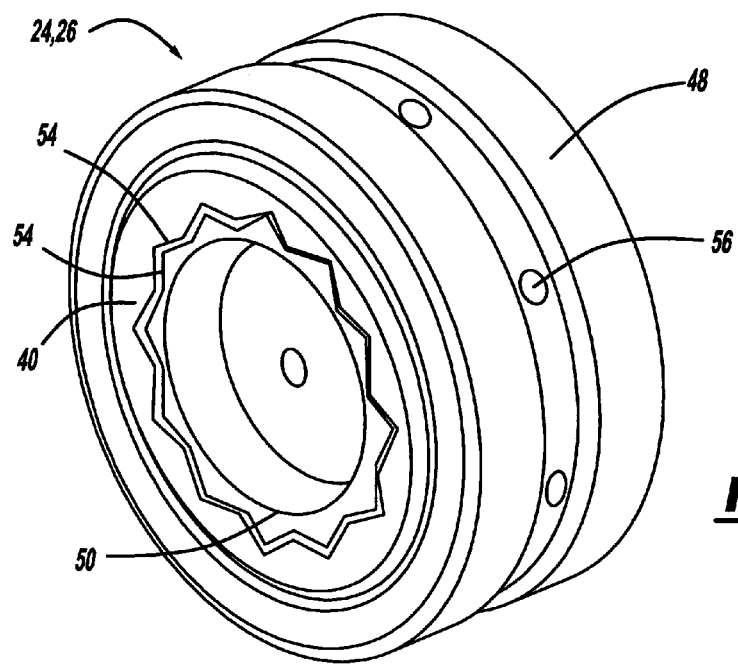
FIG. 2 is an isometric view of an assembled hybrid bearing, according to the present invention.
Figure 3:
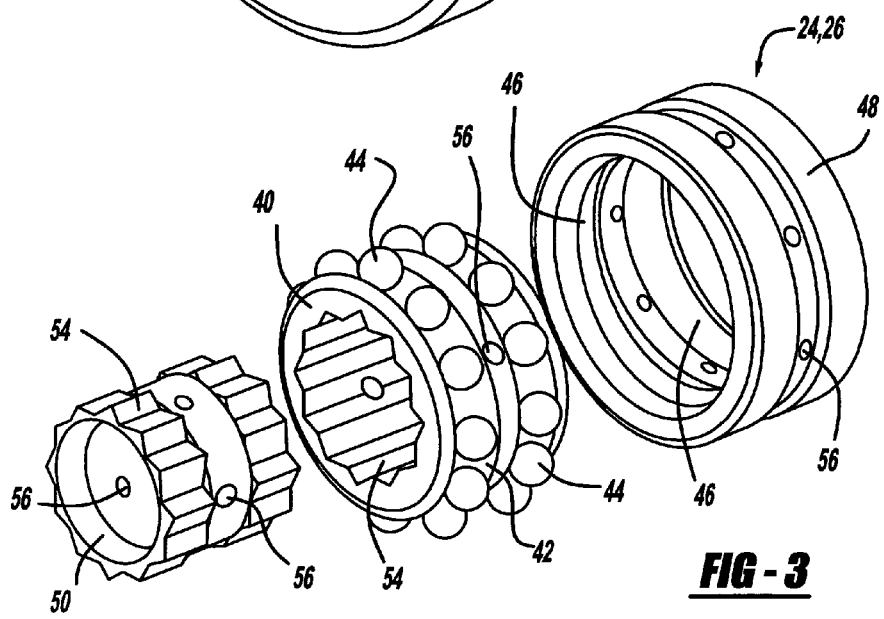
FIG. 3 is an exploded view of a hybrid bearing, according to the present invention.

As generally shown in FIGS. 2 and 3, both the first hybrid bearing 24 and the second hybrid 26 bearing are of similar construction, and have an inner race track 40, which has a series of grooves 42 for supporting one or more rolling balls 44. There is also a set of complementary grooves 46 on an outer race track 48 for also receiving the rolling balls 44. Located inside the inner race track 40 is a sleeve 50. In between the sleeve 50 and the shaft 28 is a layer of hydrodynamic oil film 52.

The first and second hybrid bearings 24, 26 utilize a sleeve 50 because the sleeve 50 is made of an established tribological material, such as bronze, which is better suited to carry an oil film. The inner race track 40, rolling balls 44, and outer race track 48 are made of a very hard steel, and are not conducive to carrying an oil film. Therefore, combining the inner race track 40, rolling balls 44, and outer race track 48 with the sleeve 50 and the hydrodynamic oil film 52 creates the first hybrid bearing 24 and the second hybrid bearing 26. There is also a series of diametric grooves 54 and radial holes 56 which allow lubricating oil to reach the rolling balls 44 and hydrodynamic oil film 52.

The assembly of the hybrid bearing into the turbocharger includes inserting the second hybrid bearing 26 into the bore 22; the second hybrid bearing rests against the stop 34. After the second hybrid bearing 26 is inserted into the bore 22, the spacer 32 is inserted and rests against second bearing 26. The first hybrid bearing 24 is then is then inserted against the spacer 32. A snap ring 36 is inserted into the annular groove 38, holding the first hybrid bearing 24 in place.

In operation, exhaust gas flows into the turbine and will cause the turbine wheel 30 to rotate at extremely high speeds. The hydrodynamic oil film 52 between the shaft 28 and the sleeve 50 will allow the shaft 28 to rotate at higher speeds than the sleeve 50. This prevents the inner race track 40, rolling balls 44 and outer race track 48 from spinning too fast, and overstressing. Additionally, the first hybrid bearing 24 and the second hybrid bearing 26, more specifically the inner race track 40, rolling balls 44, and outer race track 48, reduces the clearance needed between the turbine wheel 30 and the turbine wheel housing, and the compressor wheel and the compressor wheel housing because the shaft 28 will tilt less during operation. This improves the efficiency of the turbocharger 10 because there is less exhaust flow around the turbine wheel 30, and less air flow around the compressor wheel.

Having the first hybrid bearing 24 and the second hybrid bearing 26 configured in the manner described exhibits several advantages, one is that the hydrodynamic oil film 52 allows the shaft 28 to spin at higher speeds than inner race track 40, thereby lowering the centrifugal stresses on the rolling balls 44, improving the hybrid bearing 24, 26 life. Another advantage is that the hydrodynamic oil film 52 compensates for a small amount of misalignment that is inherent in all assemblies, and therefore the inner race track 40, rolling balls 44, and outer race track 48 together as a single unit can be slightly misaligned without causing failure. Also, the hydrodynamic oil film 52 will act as a coolant between the shaft 28, which carries a significant amount of heat, and the sleeve 50 and inner race track 40.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hybrid bearing assembly comprising:
   an inner race track having a series of grooves;
   one or more roller balls located in said series of grooves of said inner race track;
   an outer race track having a series of grooves for receiving said one or more roller balls, and circumscribing said inner race track;
   a sleeve made from an established tribological material located inside said inner race track;
   a shaft located inside said sleeve, wherein said shaft is part of a turbocharger unit and said shaft rotates at a faster speed relative to said sleeve; and
   a plurality of diametric grooves on the exterior surface of said sleeve, configured to align with diametric grooves on the interior surface of said inner race track.

2. The hybrid bearing assembly of claim 1, wherein said shaft is connected to a turbine or compressor wheel.

3. The hybrid bearing assembly of claim 1, further comprising a hydrodynamic oil film located between said sleeve and said shaft, wherein said hydrodynamic oil film allows said shaft to spin at greater speeds than said inner race track.

4. The hybrid bearing assembly of claim 3, wherein said hydrodynamic oil film compensates for a small amount of misalignment in said hybrid bearing assembly.

5. The hybrid bearing assembly of claim 3, wherein said hydrodynamic oil film absorbs heat from said shaft.

6. The hybrid bearing assembly of claim 3, wherein said hybrid bearing includes a series of diametric grooves and radial holes that allows said hydrodynamic oil film to reach said one or more roller balls and said shaft.

7. The hybrid bearing assembly of claim 1, wherein the tribological material is bronze.

8. A hybrid bearing assembly, comprising:
   an intermediate housing and a rotatable shaft extending through said intermediate housing;
   a sleeve circumscribing said shaft, wherein said shaft rotates at a faster speed relative to said sleeve;
   an inner race track having a series of grooves, circumscribing said sleeve;
   one or more roller balls, located in said series of grooves of said inner race track;
   an outer race track which circumscribes said inner race track having one or more grooves for receiving said one or more roller balls;
   a hydrodynamic oil film circumscribing the outer diameter of said shaft and the inner diameter of said sleeve, wherein said hydrodynamic oil film permits said shaft to rotate at a faster speed than said sleeve;
   a turbine wheel located in a turbine housing and connected to said rotatable shaft, said turbine housing connected to said intermediate housing, wherein the clearance between said turbine wheel and said housing is reduced due to less tilt resulting from the use of said sleeve, said inner race track, said one or more roller balls, said outer race track and said hydrodynamic oil film; and a plurality of diametric grooves on the exterior surface of said sleeve, configured to align with diametric grooves on the interior surface of said inner race track.

9. The hybrid bearing assembly of claim 8, wherein said sleeve is made from an established tribological material.

10. The hybrid bearing assembly of claim 8, wherein said hydrodynamic oil film allows for small amounts of misalignment in said hybrid bearing.

11. The hybrid bearing assembly of claim 8, wherein said hydrodynamic oil film absorbs heat between said shaft and said sleeve.

12. The hybrid bearing assembly of claim 8, wherein a series of radial holes in said hybrid bearing allows said hydrodynamic oil film to contact said one or more roller balls and said rotatable shaft.

13. A hybrid bearing assembly, comprising:
a rotatable shaft;
a first roller bearing assembly circumscribing said shaft;
a second roller bearing assembly circumscribing said shaft along the longitudinal length of said shaft at a location other than said first roller bearing assembly;
a spacer disposed between said first roller bearing assembly and said second roller bearing assembly for maintaining a distance of roller bearing assembly along the length of said shaft;
a hydrodynamic oil film circumscribing the outer diameter of said shaft, allowing said shaft to rotate at a faster speed relative to said first roller bearing assembly and said second roller bearing assembly
wherein each of said first roller bearing assembly and said second roller bearing assembly further comprises:
an inner race track circumscribing a sleeve; and
a plurality of diametric grooves on the exterior surface of said sleeve, configured to align with diametric grooves on the interior surface of said inner race track.

14. The hybrid bearing assembly of claim 13, wherein said first roller bearing assembly and said second roller bearing assembly each comprise:
a series of grooves formed as part of said inner race track;
one or more roller balls, located in said series of grooves of said inner race track; and
an outer race track which circumscribes said inner race track having one or more grooves for receiving said one or more roller balls.

15. The hybrid bearing assembly of claim 13, wherein said sleeve is made from a tribological material.

16. The hybrid bearing assembly of claim 14, further comprising a series of radial holes extending through said sleeve of each of said first and second roller bearing assemblies allowing said hydrodynamic oil film to reach said first and second roller bearing assemblies, said sleeve and said shaft.

17. The hybrid bearing assembly of claim 13, wherein said hydrodynamic oil film allows for small amounts of misalignment in said first hybrid bearing assembly and said second hybrid bearing assembly.

* * * * *

UNITED STATES PATENT AND TRADEMARK OFFICE
CERTIFICATE OF CORRECTION

| | | |
|---|---|---|
| PATENT NO. | : 8,016,554 B2 | Page 1 of 1 |
| APPLICATION NO. | : 11/657248 | |
| DATED | : September 13, 2011 | |
| INVENTOR(S) | : Ward | |

It is certified that error appears in the above-identified patent and that said Letters Patent is hereby corrected as shown below:

Column 3,
Line 39, "is then is then" should be --is then--.

Column 4, Claim 6,
Line 40, "a series of diametric grooves and radial holes" should be --a series of radial holes--.

Column 5, Claim 13,
Line 29, "assembly" should be --assembly;--.

Signed and Sealed this
Seventeenth Day of January, 2012

David J. Kappos
*Director of the United States Patent and Trademark Office*